Sept. 6, 1966   D. G. GOLDWASSER   3,270,576
FRICTION DRIVE TRANSMISSION
Filed Feb. 10, 1964
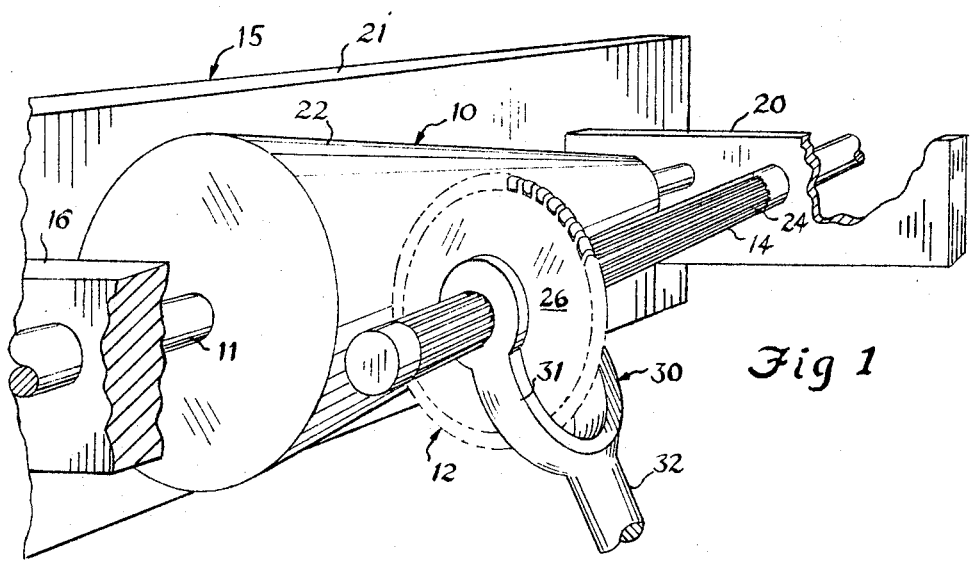
Fig 1
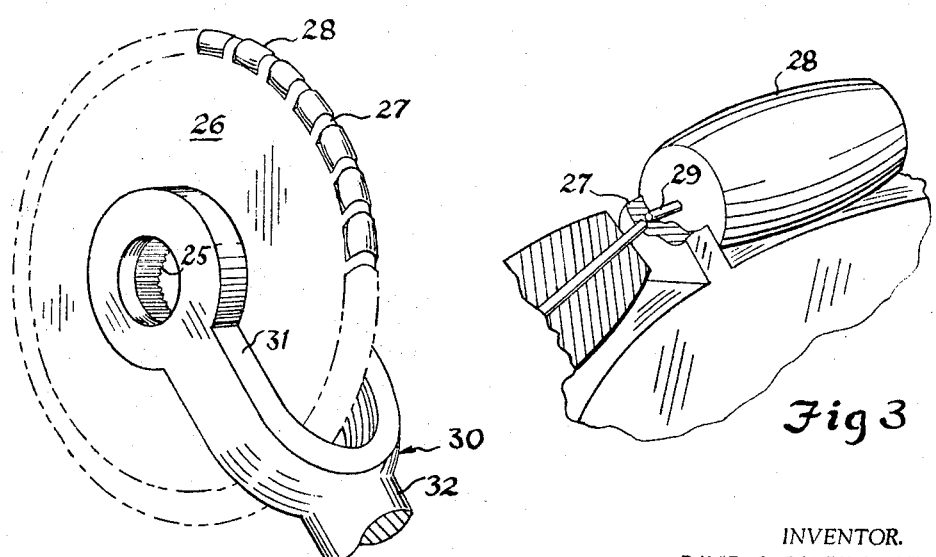
Fig 2
Fig 3
INVENTOR.
DAVID G. GOLDWASSER
BY Newton, Hopkins & Jones
ATTORNEYS

United States Patent Office

3,270,576
Patented Sept. 6, 1966

3,270,576
FRICTION DRIVE TRANSMISSION
David G. Goldwasser, 558 Orme Circle NE.,
Atlanta, Ga.
Filed Feb. 10, 1964, Ser. No. 343,645
5 Claims. (Cl. 74—191)

This invention relates to friction drive power transmissions and is more particularly related to a friction drive power transmission producing variable speed outputs with a constant speed input.

Friction drive transmissions having a conical driving member with a frictional driving surface thereon rotatably driving a disc-shaped driven member have in the past been faced with the problem that a large force was required to move the driven member longitudinally along the driving member so as to change the speed of rotation of the driven member. Another resulting disadvantage in these previous transmissions has been the excessive wearing away of the periphery of the driven member by the frictional driving surface of the driving member as the driven member was moved longitudinally along the driving member so as to vary the rotational speed of the driven member.

Previous efforts have attempted to overcome the aforementioned problems in the past but the results of these efforts have been limited in their use or have been expensive to manufacture. One such effort has been to move the driven member radially outward from the driving surface, then moving the driven member longitudinally along the driving member while the driven member is held away from the driving surface of the driving member and finally moving the driven member radially back toward the driving member until the periphery of the driven member is once again drivingly contacted by the driving surface of the driving member. However, several disadvantages are inherent with this effort at overcoming the wear and force problems with previous friction drive transmissions. The output shaft from the driven member must be movable in order for the driven member to be moved outwardly from the driving surface of the driving member or a complicated gearing arrangement must be used if the driven member is to be moved away from the driving surface of the driving member without moving the output shaft. The equipment necessary to move the output shaft radially outward from the driving member or to gear the driven member to the output shaft so that the driven member may be moved outwardly from the driving member without moving the output shaft is both expensive to manufacture and maintain. Also the periphery of the driven member becomes worn in spots due to the initial starting of the driven member to rotate when the driving surface and the driven member contact each other, and accurate speed changes are difficult to make due to the lack of an indication of what the speed of rotation will be when the driven member again contacts the driving member.

The present invention comprises, generally, a support frame, a conical driving member rotatably held by the support frame, and a driven member rotatably held by the support frame so that the periphery of the driven member is in contact with the surface of the driving member. A means is provided whereby the driven member may be moved along the length of the surface of driving member while maintaining contact at all times with the driving member. The periphery of the driven member is comprised of a plurality of rollers that roll along the surface of the driving member as the driven member moves longitudinally along the driving member but which do not roll as the driving member rotates with the driven member. To change the output shaft rotational speed with constant input shaft rotational speed the driven member is moved longitudinally along the driving member.

The present invention, therefore, completely overcomes the problems and disadvantages associated with previous friction drive transmissions having a conical driving member and a disc-shaped driven member. The rollers along the periphery of the driven member of the present invention roll on the surface of the driving member as the driven member moves longitudinally along the surface of the driving member, and the driven member as a whole rotates on the surface of the driving member as the driving member rotates. Thus, substantially all sliding motion between the driven member and the driving member is eliminated. This in turn, eliminates substantially all friction wear to the periphery of the driven member.

The support frame for the present invention is simple and easy to manufacture since the output and input shafts are maintained in a fixed position relative to each other and no adjustment need by incorporated into the frame in order to compensate for wear to the driven member since this wear is substantially eliminated.

Also no complicated gearing arrangement is needed for the present invention although the relation of the output shaft to the input shaft remains fixed since the driven member is freely movable along the surface of the driving member even while maintaining contact with the surface of the driving member.

An infinitesimally small change in the speed of rotation of the output shaft is possible with the present invention since the driven wheel is always in contact with the surface of the driving member whereas small changes in the speed of rotation of the output shaft of previous friction drive transmissions have been harder to obtain since the driven member must be lifted away from the surface of the driving member, moved to the proper location and then placed again against the surface of the driving member.

Since the driven member of the present invention is always in contact with the surface of the driving member, changes in the speed of rotation of the driven member may be made while the transmission is powering some machinery of known type without the changes in the torque output of the transmission that have normally been encountered during speed changes with previous transmissions.

These and other features and advantages of the present invention will become apparent from consideration of the following specification and the accompanying drawings wherein like characters of reference designate corresponding parts throughout and in which:

FIG. 1 is a perspective view of an embodiment of the present invention.

FIG. 2 is an enlarged perspective view of the driven member of the embodiment of the present invention shown in FIG. 1.

FIG. 3 is an enlarged partial perspective view of the driven member showing the rollers along the periphery thereof and with one roller in section.

These figures and the following detailed description disclose a specific embodiment of the present invention but the invention is not limited in any way by the embodiment of the present invention disclosed herein since the invention may be embodied in other equivalent forms.

The present invention comprises generally a support frame 15 positioning a conical driving member 10 with respect to a driven member 12 so that the driving member 10 contacts the driven member 12 and forces the driven member 12 to rotate as the driving member 10 rotates.

The support frame 15 comprises a rectangular base plate 21 from one end of which extends a left support member 16 and from the opposite end of which extends a right support member 20. The right and left support members 20 and 16 are spaced apart just sufficiently to receive the driving member 10 between them as they extend perpendicularly outward from the base plate 21.

The driving member 10 is carried by an input shaft 11 rotatably extending between the left support member 16 and the right support member 20, and the input shaft 11 is fixed to the driving member 10 so that as the input shaft 11 is rotated by some known source (not shown) the driving member 10 is also rotated. The driving member 10 has a surface 22 which is constructed in known manner so that if a rotatable member is forced against the surface 22, the rotatable member is forced to rotate with the driving member 10.

The driven member 12 is carried by an output shaft 14 rotatably mounted between the left support member 16 and the right support member 20. The output shaft 14 is mounted parallel to the surface 22 of the driving member 10 and positions the driven member 12 so that the periphery of the driven member 12 is forced against the surface 22 of the driving member 10. Thus, as the input shaft 11 rotates, the driving member 10 is rotated and forces the driven member 12 to rotate.

The driven member 12 comprises a circular central web 26 through the center of which extends the shaft 14, a plurality of support tabs 27 integral with the central web 26 and extending radially outward from and equally distributed about the circumference of the central web 26, and a plurality of rollers 28 mounted around the periphery of the central web 26. The rollers 28 are rotatably mounted between adjacent support tabs 27 on axles 29 extending between the support tabs 27 as is shown in FIG. 3.

The rollers 28 have a shape such that when they are mounted between the support tabs 27 around the circumference of the central web 26, they form an intermittent surface concentric with the periphery of the central web 26. The axles 29 are perpendicular to the output shaft 14 and to radii of the central web 26 thereby allowing the rollers 28 to rotate only with motion of the driven member 12 along the output shaft 14. The support tabs 27 also hold the rollers 28 in position on the axles 29. Hence, the driven member 12 rolls lengthwise along the surface 22 on the rollers 28 but is forced to rotate about the centerline of the output shaft 14 as the driving member 10 rotates.

The driven member 12 drivingly engages the output shaft 14 through a plurality of grooves 24 evenly spaced about the circumference of the output shaft 14 and extending along that portion of the output shaft 14 extending between the left support member 16 and the right support member 20. The grooves 24 are parallel to the centerline of the output shaft 14. The central web 26 of the driven member 12 has a plurality of teeth 25 corresponding with and engaging the grooves 24 in the output shaft 14 thereby allowing the driven member 12 to drive the output shaft 14 yet be able to slide along the length of the output shaft 14 extending between the left and right support members 16 and 20. As the central web 26 of the driven member 12 slides along the output shaft 14, the rollers 28 of the driven member 12 are always forced against the surface 22 of the driving member 10 by the output shaft 14.

Since the sliding friction normally encountered with friction drive transmissions when the driven member is moved lengthwise the driving member is substantially eliminated by the rollers 28, no adjustments are needed to compensate for the wear normally encountered with friction drive transmissions.

A positioning member 30 comprising a yoke 31 and a handle 32 integral with the yoke 31 is slidably mounted on the output shaft 14. The yoke 31 is a U-shaped member slidably and rotatably connected to the output shaft 14 adjacent opposite sides of the driven member 12 and extends over the driven member 12 so as to allow the driven member 12 to rotate. The handle 32 extends outwardly from the yoke 31 perpendicular to the output shaft 14.

As the handle 32 is moved by hand or some similar means, the yoke 31 forces the driven member 12 to slide along the output shaft 14 and the rollers 28 to roll along the surface 22 of the driven member 12 so as to change the speed of rotation of the driven member 12 and the output shaft 14.

The maximum speed of rotation is produced in the output shaft 14 when the driven member 12 is at the end of the driving member 10 having the largest diameter, and the minimum speed of rotation is produced in the output shaft 14 when the driven member 13 is at the end of the driving member 10 having the smallest diameter. As the driven member 12 is moved from one end of the driving member 10 to the other by the positioning member 30 an infinite variation of speeds of rotation from the maximum to the minimum speed of rotation is produced in the output shaft 14.

*Operation*

From the foregoing description the operation of the present invention will be apparent. A power means of known type (not shown) is connected to and rotates the input shaft 11, usually at a constant speed of rotation, which in turn rotates the driving member 10. The driven member 12, being forcibly held against the surface 22 of the driving member 10 by the output shaft 14 and the support members 16 and 20, is rotated by the driving member 10. The driven member 12 rotates the output shaft 14 by engaging the grooves 24 in the output shaft 14 with the teeth 25 of the central web 26, thus powering some piece of equipment (not shown) that requires variable speed input.

To change the speed of rotation of the output shaft 14, the handle 32 is moved toward the larger diameter of the driving member 10 to increase the speed of rotation and toward the smaller diameter of the driving member 10 to decrease the speed of rotation. As the handle 32 is moved along the output shaft 14, the driven member 12 is moved longitudinally along the surface 22 with the rollers 28 continuously engaging the surface 22 so that the output shaft 14 continuously rotates.

From what has been said above, it will be understood that the speed of rotation of the output shaft 14 is easily changed simply by moving the positioning member 30 and the driven member 12 along the output shaft 14 and the length of the driving member 10. Thus, the transmission described herein, provides a constant power output with an infinite number of speeds of rotation for the power output shaft 14 between a maximum and minimum speed of rotation determined in known manner by the shape and length of the driving member.

It will be obvious to those skilled in the art that many variations may be made in the embodiments chosen for the purpose of illustrating the present invention without departing from the scope thereof as defined by the appended claims.

What is claimed as invention is:

1. In a friction drive transmission having a conical driving member, a driven member allowing relative motion between the driven member and the driving member only as the driven member moves longitudinally along the driving member, said driven member comprising a central web, a plurality of support tabs extending radially outward from said central web, and a plurality of rollers, each of said rollers being rotatably mounted between adjacent tabs for rotation about an axis transverse to the said relative motion between the driven member and the driving member.

2. In a friction drive transmission having a conical driving surface, a driven surface having a plurality of rotatable members around the periphery thereof positioned to rotate only with longitudinal motion of the driven surface along the driving surface as the driven member is held against the said driving surface.

3. In a friction drive transmission having a conical driving member, the combination therewith of a driven member having a plurality of rollers rotatably attached to the outer periphery of said driven member so as to allow relative motion between the driven member and the driving member only as the driven member moves longitudinally along the driving member.

4. In a friction drive transmission, a support member; an input shaft rotatably carried by said support member; a conical driving member carried by said input shaft and fixed to said input shaft so as to rotate as said input shaft rotates; a driven member having a central web carried by said output shaft and a plurality of rotatable members carried by the central web along the outer surface thereof and forming an intermittent circular surface about said output shaft; and means for selectively moving said intermittent circular surface longitudinally along said driving member.

5. In a friction drive transmission, a support member; an input shaft rotatably carried by said support member; a conical driving member carried by said input shaft; an output shaft rotatably carried by said support member and positioned with its axis of rotation parallel to the surface of said driving member; a disc-shaped driven member mounted on the output shaft, said driven member having a central web carried by said output shaft and a plurality of rotatable members carried by the central web along the outer surface thereof, forming an intermittent cylindrical surface which engages the driving member, and rotatable only with motion of the driven member longitudinally along said driving member; and means for moving said driven member longitudinally along said driving member.

References Cited by the Examiner

UNITED STATES PATENTS

| | | | |
|---|---|---|---|
| 970,995 | 9/1910 | Dill | 74—199 |
| 2,642,749 | 6/1953 | Wood | 74—191 |
| 3,082,634 | 3/1963 | Battistin | 74—199 |

DAVID J. WILLIAMOWSKY, *Primary Examiner.*

L. H. GERIN, *Assistant Examiner.*